US008775642B2

(12) United States Patent
Järvenpää et al.

(10) Patent No.: US 8,775,642 B2
(45) Date of Patent: Jul. 8, 2014

(54) METHOD, SYSTEM AND APPARATUS FOR COMMUNICATION

(75) Inventors: Marko Järvenpää, Hyvinkää (FI); Tero Jalkanen, Tuusula (FI)

(73) Assignee: Teliasonera AB (SE)

( * ) Notice: Subject to any disclaimer, the term of this patent is extended or adjusted under 35 U.S.C. 154(b) by 6 days.

(21) Appl. No.: 13/306,353

(22) Filed: Nov. 29, 2011

(65) Prior Publication Data

US 2012/0144048 A1  Jun. 7, 2012

(30) Foreign Application Priority Data

Dec. 2, 2010  (EP) .................................... 10193457

(51) Int. Cl.
*G06F 15/16* (2006.01)

(52) U.S. Cl.
USPC .......................................... 709/228; 709/217

(58) Field of Classification Search
USPC ........... 709/212–247; 340/1.1–16.1; 710/104; 726/26–33; 370/259–263, 392; 379/114.01–115.03, 220.01–221.15
See application file for complete search history.

(56) References Cited

U.S. PATENT DOCUMENTS

| | | | |
|---|---|---|---|
| 7,281,137 B1 * | 10/2007 | Vitikainen ..................... | 713/189 |
| 2002/0027915 A1 * | 3/2002 | Foti et al. ..................... | 370/392 |
| 2005/0111641 A1 * | 5/2005 | Koskinen et al. ........... | 379/114.2 |
| 2006/0239206 A1 * | 10/2006 | Rao et al. ..................... | 370/254 |
| 2007/0121890 A1 * | 5/2007 | Li et al. ..................... | 379/221.13 |
| 2007/0258575 A1 | 11/2007 | Douglas et al. | |
| 2008/0130523 A1 * | 6/2008 | Fridman et al. ............... | 370/259 |
| 2009/0067408 A1 * | 3/2009 | Leppainen et al. ........... | 370/350 |
| 2009/0282236 A1 * | 11/2009 | Hallenstal et al. ........... | 713/151 |
| 2011/0216762 A1 * | 9/2011 | Nas ................................ | 370/352 |
| 2012/0011273 A1 * | 1/2012 | Van Elburg et al. ......... | 709/238 |

FOREIGN PATENT DOCUMENTS

| | | | |
|---|---|---|---|
| EP | 1 761 077 A1 | | 9/2006 |
| WO | WO 2004006534 A1 | * | 1/2004 |
| WO | WO 2004075507 A2 | * | 9/2004 |
| WO | WO 2008/031927 A1 | | 3/2008 |

* cited by examiner

*Primary Examiner* — Dustin Nguyen
*Assistant Examiner* — Michael A Keller
(74) *Attorney, Agent, or Firm* — Cozen O'Connor

(57) ABSTRACT

A method for managing user terminal identification information is described. In response to an invitation message to establish communication between terminals, a first address identification of a terminal, included in the message, is examined. Based on the first address identification, a first number identification for the corresponding terminal is retrieved from an ENUM database. Based on the retrieved first number identification, a second number identification maintained for the user terminal is retrieved from an MNP database. It is checked whether the number identifications correspond to each other. Based on that, a second address identification corresponding the second communication number identification is retrieved from the ENUM database, and the invitation message is forwarded towards a recipient user terminal such that the second address identification is included in the message.

18 Claims, 3 Drawing Sheets

METHOD, SYSTEM AND APPARATUS FOR COMMUNICATION

BACKGROUND OF THE INVENTION

1. Field of the Invention

The exemplary and non-limiting embodiments of the invention relate generally to communication systems and more specifically to managing user terminal identification information.

2. Description of the Related Art

Mobile number portability (MNP) refers to number portability allowing a mobile subscriber to change the subscription network within the same country whilst retaining the original MSISDN (mobile subscriber international ISDN number) or MDN (mobile directory number) of the subscriber.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

According to an aspect of the present invention there is provided a method, wherein, in response to receiving, in a network apparatus, an invitation message to establish communication between user terminals, the method comprises examining a first communication address identification of a user terminal, included in the invitation message. The examining comprises retrieving, based on the first communication address identification, a first communication number identification maintained for the corresponding user terminal. Based on the retrieved first communication number identification, a second communication number identification maintained for the user terminal is retrieving. It is checked whether the first communication number identification and the second communication number identification correspond to each other. On the basis of the result of said checking, the method further comprises retrieving a second communication address identification corresponding the second communication number identification, and forwarding the invitation message towards a recipient such that the second communication address identification is included in the invitation message.

According to another aspect of the present invention there is provided a communications system, wherein, in response to receiving, in a network apparatus, an invitation message to establish communication between user terminals, the system is configured to examine a first communication address identification of a user terminal, included in the invitation message. The system is configured to retrieve, based on the first communication address identification, a first communication number identification maintained for the corresponding user terminal. Based on the retrieved first communication number identification, the system is configured to retrieve a second communication number identification maintained for the user terminal. The system is configured to check whether the first communication number identification and the second communication number identification correspond to each other. On the basis of the result of said checking, the system is further configured to retrieve a second communication address identification corresponding the second communication number identification, and forward the invitation message towards a recipient such that the second communication address identification is included in the invitation message.

According to yet another aspect of the present invention there is provided an apparatus, wherein, in response to receiving an invitation message to establish communication between user terminals, the apparatus is configured to examine a first communication address identification of a user terminal, included in the invitation message. The apparatus is configured to retrieve, based on the first communication address identification, a first communication number identification maintained for the corresponding user terminal. Based on the retrieved first communication number identification, the apparatus is configured to retrieve a second communication number identification maintained for the user terminal. The apparatus is configured to check whether the first communication number identification and the second communication number identification correspond to each other. On the basis of the result of said checking, the apparatus is further configured to retrieve a second communication address identification corresponding the second communication number identification, and forward the invitation message towards a recipient such that the second communication address identification is included in the invitation message.

By means of the exemplary, embodiment a user terminal may maintain its original communication address identification (such as SIP URI, indicating an original home network operator of the user terminal), while the network apparatus is enabled to retrieve an updated communication address identification (such as SIP URI, indicating an updated home network operator of the user terminal) and use it internally e.g. for network routing purposes.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the following the invention will be described in greater detail by means of preferred embodiments with reference to the accompanying drawings, in which.

DETAILED DESCRIPTION OF THE PRESENTLY PREFERRED EMBODIMENTS

Figure 1:
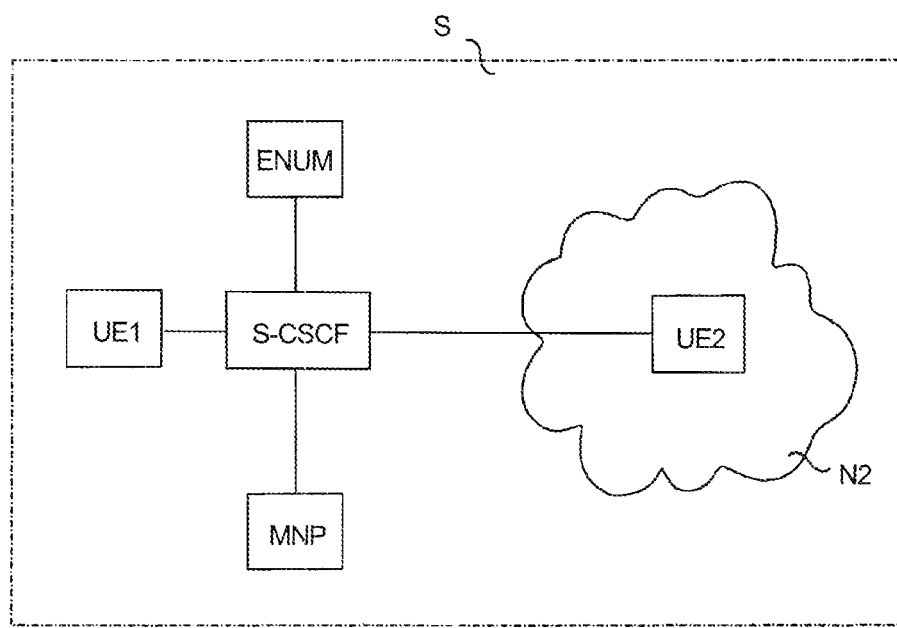
FIG. 1 illustrates a communications system according to an exemplary embodiment.

Electronic numbering (ENUM) refers to a distributed directory system which may be based on a domain name service (DNS), providing multimedia messaging service directory information. Electronic numbering may be used for mapping telephone numbers e.g. to web addresses, email addresses, URIs, or URLs.

Currently number portability exists only as mobile number portability (MNP), and also as some level of fixed number portability. Thus current number portability relates only to MSISDNs (mobile subscriber international ISDN number)

and fixed numbers, i.e. regular telephone numbers. However, users will also have other types of identifiers e.g. due to the introduction of IMS (IP multimedia subsystem)-based services such as RCS (Rich Communication Suite).

Using only MSISDN, instead of SIP URI (session initiation protocol uniform resource identifier), offers a solution where, for example, Matti's contacts do not have to change their address books regarding information on Matti, since MNP exists for MSISDNs. However, this is quite a limiting factor since URIs, such as SIP URIs or even email addresses, really are the only way to route calls/sessions/messages in IP (internet protocol)-based networks. So, if MSISDN is used by the end-user then it has to be converted into URI within the network by a standard ENUM solution before the routing can take place by IP.

An exemplary embodiment defines a method for the network to check and add/modify incoming and/or outgoing SIP requests based on the network first performing an MNP check and then correcting parameters such as "to", "from", "P-asserted-identity" and/or P-preferred identity in a SIP message based on MNP information.

For any kind of incoming and/or outgoing (i.e. towards the device and/or from the device) SIP messages, the address(es) of the contact are, depending on the type of request, provided as a uniform resource identifier (URI) in the body of the request (e.g. in case of a watcher info notification) or contained in the P-asserted-identity and/or the "from" headers. The receiving client tries to extract the contact's phone number out of the following types of URI:

tel URI (e.g. tel:+1234578901 or
tel:0234578901; phonecontext=phonecontextvalue),
SIP URI, with a "user=phone" parameter, the contact's
  phone number is provided in the user part (e.g. sip:+
  1234578901@operator.com;user=phone or
  sip:0234578901;
    phonecontext=phonecontextvalue@operatorcorn;
    user=phone).

An exemplary embodiment makes sure that outgoing SIP messages are addressed with the correct SIP URI, corrected automatically by the originating operator core network, if needed. Thus, there is no need to modify anything in client side or the receiving operator side. The only modification needed is to the originating operator C-CSCF (or a similar network node) which performs the actual lookup for URI and corrects it, if needed.

An exemplary embodiment describes a SIP message modification solution in order to exploit known number portability method for SIP URIs. The number portability may thus also be extended to identities other than MSISDNs. An exemplary embodiment describes how to derive a correct SIP URI in case of operator change. An advantage is the possibility to exploit current number portability network elements (ENUM<->S-CSCF<->MNP) in order to implement functionality of the present solution.

If an Elisa user who has identifier such as SIP URI matti.vanhanen@elisa.fi finally notes that Sonera, in fact, has much better offering and decides to switch to Sonera user, it is currently impossible to keep the existing identifier matti.vanhanen@elisa.fi. Thus, matti.vanhanen@elisa.fi would be replaced e.g. by matti.vanhanen@sonera.fi. This is of course not the ideal solution since all of Matti's contacts would need to change Matti's new address into their address books.

Using only MSISDN instead of SIP URI does indeed offer the solution where Matti's contacts do not have to change their address books since MNP exists for MSISDNs. Using only MSISDN is a quite straightforward and simple mechanism to go around this problem. However, using only MSISDN does not allow any other kind of addressing for end-users. Using only MSISDN does not solve the network routing needs but only the end-user address book problem.

Exemplary embodiments of the present invention will now be de-scribed more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Like reference numerals refer to like elements throughout.

The present solution is applicable to any user terminal, server, corresponding component, and/or to any communication system or any combination of different communication systems that support mobile number portability. The communication system may be a fixed communication system or a wireless communication system or a communication system utilizing both fixed networks and wireless networks. The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, the embodiment.

In the following, different embodiments will be described using as an example of a system architecture whereto the embodiments may be applied, an architecture based on an evolved UMTS terrestrial radio access network of an enhanced cellular network (E-UTRAN). Although E-UTRAN is discussed as a primary example herein, the present solution is not limited to E-UTRAN, LTE, and/or 3GPP systems. Thus, the present solution may also be applicable to other communications systems such as WiMAX (worldwide interoperability for microwave access), HSDPA (high-speed downlink packet access), HSUPA (high-speed uplink packet access), and/or WLAN (wireless local area network).

A general architecture of a communication system providing an advanced communications service to a user terminal is illustrated in FIG. 1. FIG. 1 is a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements and the protocols used in or for group communication, are irrelevant to the actual invention. Therefore, they need not to be discussed in more detail here.

FIG. 1 provides an example of an environment where the present solution may be used. Referring to FIG. 1, a communications system S according to an exemplary embodiment of the present solution comprises a user equipment UE1, UE2 that may be e.g. a mobile or wireless user terminal, such as a mobile phone (mobile station), a personal digital assistant (PDA), a game console, a smart phone, a personal computer (PC), a laptop, a desktop computer or the like, capable of processing presence data. The system S further comprises a core network element S-CSCF, such as a serving call state control function or any other core network element supporting mobile-originated and/or mobile-terminated communication. The serving call state control function S-CSCF is operatively connected to an electronic numbering database ENUM. The serving call state control function S-CSCF is also operatively connected to a mobile number portability database MNP. In the example shown in FIG. 1, a first user terminal UE1 belongs to a first user ("user A", A subscriber) and is capable of connecting to the serving call state control function S-CSCF. A second user terminal UE2 belongs to a second user ("user B", B subscriber), and an operator network N2 is the home operator network of UE2. UE1 and UE2 are able to communicate with each other via one more network nodes S-CSCF.

FIG. 1 shows a simplified version of an evolved UMTS (universal mobile telecommunications system) terrestrial radio access network structure, which only illustrates the components that are essential to illustrate the present solution, even though those skilled in the art naturally know that a general communications system also comprises other functions and structures, which do not have to be described in more detail herein. The network element S-CSCF, ENUM, MNP may include any network element operated by a network operator in a cellular, wireless and/or fixed network, such as a mobile switching centre. GGSN, VLR, HLR, HSS, base station, access point, radio net-work controller, database, and/or a network computer or server. Although each network element UE1, UE2, S-CSCF, ENUM, MNP, N2 has been depicted as one entity, different modules and memory may be implemented in one or more physical or logical entities. A general architecture of a communication system providing session-based communication is illustrated in FIG. 1. It is apparent to a person skilled in the art that the systems also comprise other functions and structures. It should be appreciated that the functions, structures, elements and the protocols used in or for session-based communication are irrelevant to the actual invention. Therefore, they need not be discussed in more detail here.

Figure 2:
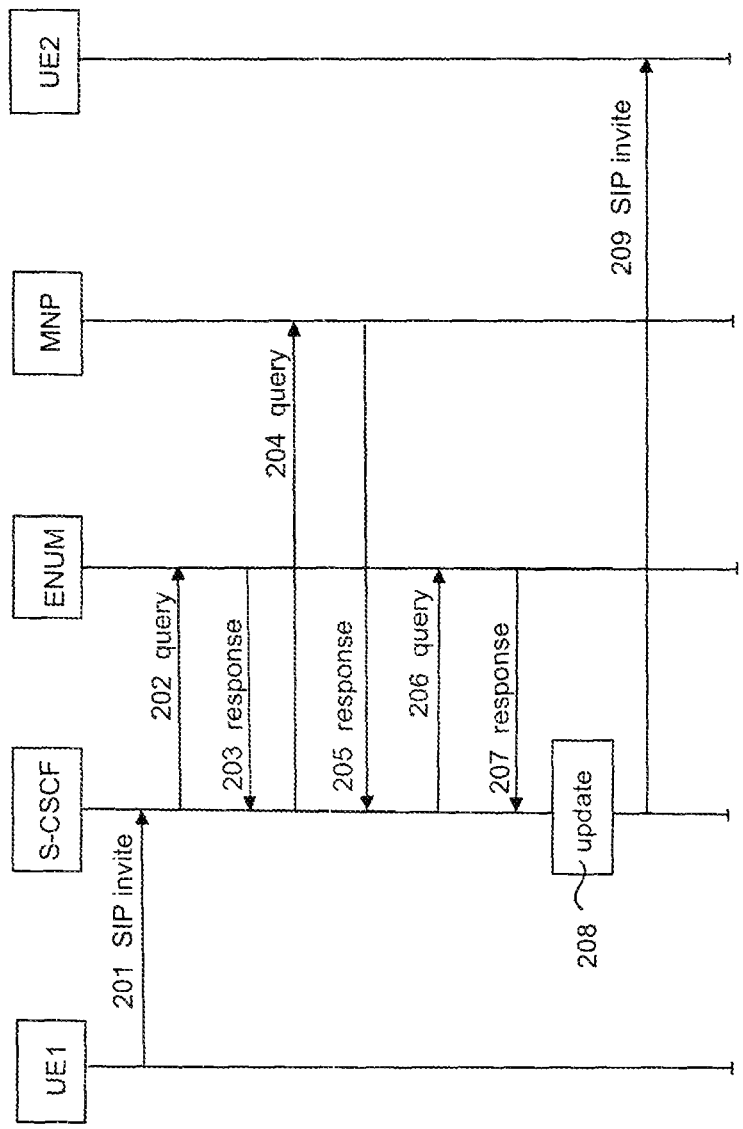
FIG. 2 illustrates signalling according town exemplary embodiment.

FIG. 2 illustrates signalling between network elements according to an exemplary embodiment of the present solution. FIG. 2 depicts the signalling how the present solution may be implemented in an IP multimedia subsystem IMS. Referring to FIG. 2, user A wishes to establish an RCS multimedia session with user B (i.e. with Matti Vanhanen). User A selects Matti from her address book and presses "start" in UE1. The uniform resource identifier URI in user A's address book in UE1 happens to be matti.vanhanen@elisa.fi; so, in response to "Matti" and "start" being selected, matti.vanhanen@elisa.fi is used as "to" field in a SIP invite message 201 which is thus constructed by an RCS client and sent 201 towards a serving operator IMS core system. The SIP invite message (having "matti.vanhanen@elisa.fi" in "to" field) sent by UE1 is received in S-CSCF. Based on the receiving, S-CSCF is automatically configured to perform an MNP-related check. Thus, a reverse ENUM look-up 202, 203 is carried out, meaning that S-CSCF sends a query 202 "matti.vanhanen@elisa.fi" to an ENUM database and receives a response 203 such as "+358501234567" from ENUM. S-CSCF performs an MNP check 204, 205 on the received MSISDN "+358501234567" e.g. by using a normal country-level MNP database and receives a response "+358401234567" indicating that Matti has indeed switched from a first network operator (Elisa) to a second network operator (Sonera, N2) (meaning that S-CSCF sends a query 204 "+358501234567" to an MNP database, and receives a response 205 such as "+358401234567"; S-CSCF is then able to compare the queried MSISDN and the response MSISDN and detect whether or not they correspond each other). S-CSCF performs a final check 206, 207, this time sending query 206 with an MNP-corrected MSISDN "+358401234567" to the ENUM database. The ENUM database responds 207 with "matti.vanhanen@sonera.fi" which is the updated correct SIP URI for Matti. In step 208, S-CSCF updates the "to" field in the SIP invite message and forwards 209 the updated SIP invite message towards the correct receiving operator (i.e. towards N2/UE2). (However, if the queried MSISDN 204 and the response MSISDN 205 corresponded to each other, it is not necessary to perform the final check; in that case the process may continue by forwarding 209 the original SIP invite message (i.e. without the updating of the "to" field) from S-CSCF towards UE2).

Figure 3:
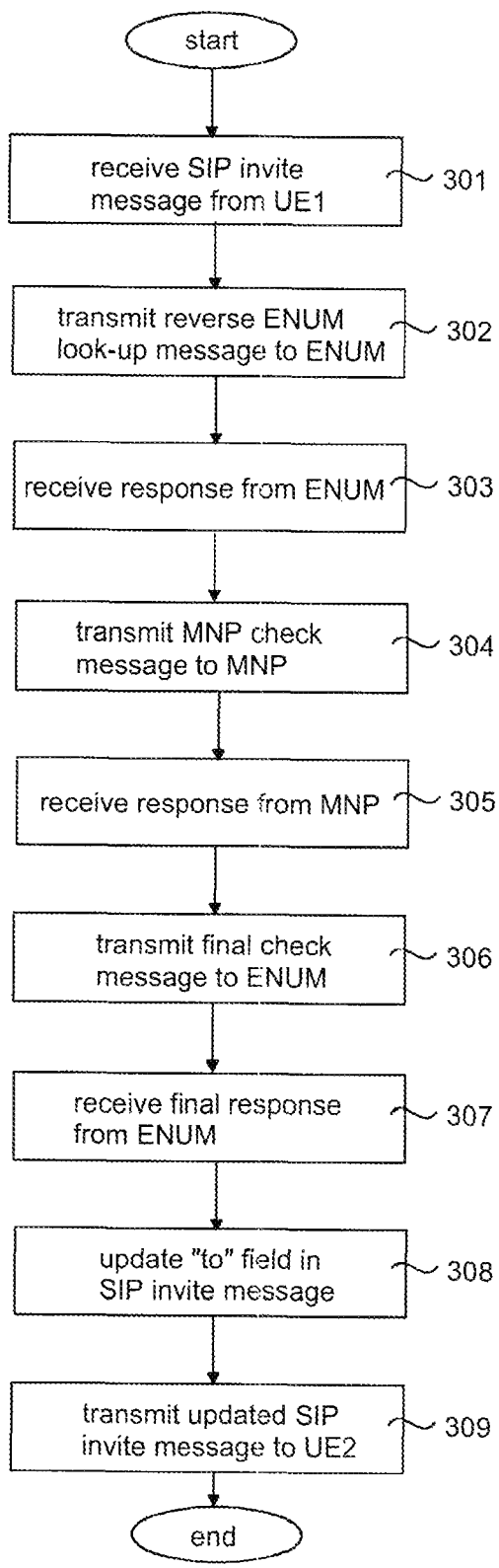
FIG. 3 is a flow chart illustrating the operation of a network apparatus according to an exemplary embodiment.

FIG. 3 is a flow chart illustrating the operation of a network apparatus according to an exemplary embodiment of the present solution. Referring to FIG. 3, the user of UE1 (i.e. user A) wishes to establish an RCS multimedia session with the user of UE2 (i.e. user B; Matti Vanhanen). The uniform resource identifier URI for UE2/user B in user A's address book in UE1 happen to be matti.vanhanen@elisa.fi; so, matti.vanhanen@elisa.fi is used as "to" field in a SIP invite message which is thus received 301 in the network apparatus (e.g. in a serving call state control function S-CSCF of the home network operator of UE1) from UE1. Based on the receiving, S-CSCF is automatically configured to perform an MNP-related check. Thus, a reverse ENUM look-up 302, 303 is carried out, meaning that S-CSCF sends 302 a query "matti.vanhanen@elisa.fi" to an ENUM database and receives a response 303 such as "+358501234567". S-CSCF performs an MNP check 304, 305 on the received MSISDN "+358501234567" by using a normal country-level MNP database and receives a response "+358401234567" indicating that Matti has indeed switched his home network operator from a first network operator (e.g. Elisa) to a second network operator (eg. Sonera, N2) (the MNP check mean that S-CSCF sends 304 a query "+358501234567" to an MNP database, and, receives 305 a response such as "+358401234567"; S-CSCF is then able to compare the queried MSISDN and the response MSISDN and detect whether or not they correspond each other). S-CSCF performs a final check 306, 307, this time sending 306 a query with the MNP-corrected MSISDN "+358401234567" to the ENUM database. A response with "matti.vanhanen@sonera.fi" is received 307 from the ENUM database which is the updated correct SIP URI for Matti. In step 308, S-CSCF updates the "to" field in the SIP invite message to include "matti.vanhanen@sonera.fi", and forwards 309 the updated SIP invite message towards the correct receiving operator (i.e. towards N2/UE2) based on the updated SIP URI. (However, if the queried MSISDN 304 and the response MSISDN 305 corresponded to each other, it is not necessary to perform the final check; in that case the process may continue by forwarding 209 the original SIP invite message (i.e. without the updating of the "to" field) from S-CSCF towards UE2).

S-CSCF may be configured to perform the checking steps 302 to 308 only once for a specific recipient UE2 (or sender UE1), and then store the correct MSISDN and SIP URI in a relevant database (so that the checking and/or updating steps do not have to be performed again each time a new session is initialized). However, as some user terminals, may switch their home network operator quite frequently, it may be more reliable if S-CSCF is configured to perform the checking (and, if needed, the updating) "every time" UE1 initializes a new session.

The exemplary embodiments shown in the figures are simplified. The queries and responses used may be regular reverse ENUM, ENUM and MNP queries/responses, i.e. they do not need to be modified in any way to support the exemplary embodiments.

It should be noted that the databases ENUM, MNP illustrated in the figures may be implemented as separate units or combined into a single database offering both ENUM (including reverse ENUM) and MNP related information.

Note that even though RCS, SIP URI and IMS are used as examples in this context, the present solution may also be used by services other than RCS, by platforms/servers other than IMS and by session set-up protocols other than SIP. The present solution is not protocol-dependent as such. In addition to or instead of SIP URI, there may be other addresses used by the end-user (such as email address) that may potentially also be supported by the present solution. In addition to or instead of IMS, another kind of core platform, such as a SIP server, may be used. And in addition to or instead of RCS, the present solution may also support other services, i.e. it may be application/service agnostic.

The MNP check may not work exactly like illustrated here since it is dependent on, for example, country level policies and restrictions. As long as the principles of performing the MNP-related check using ENUM and MNP databases and then performing the MNP correction, if needed, exist, it is possible to implement the exemplary embodiments.

In addition to fixing the recipient URI it may also be possible to correct the sender URI with the same mechanism. i.e. the network may be configured to double-check the origin identity of any outgoing SIP messages (SIP message parameters "from" and/or "P-preferred-identity"), in case these are outdated/otherwise incorrect, and modify them if needed. An example of this might be that the serving operator has decided to change its policy on URIs, i.e. the used URIs need to be modified by the network before clients themselves get updated with the new URI-related information.

In the above example the correct number/identifier was found in the normal country-level database, however, if that is not successful the relevant node (MNP database and/or ENUM database) makes a further query to one or more foreign databases until the correct number/identifier is found. It should be noted that the databases may be organised at network-level, operator level, country level or at any suitable level. S-CSCF may be first configured to perform the queries e.g. to a relevant home operator database or home country database, and if the query is not successful, the database or S-CSCF may trigger a further query to an upper level database (e.g. a foreign or international database) until a correct number/identifier is found.

It should be noted that the updating of the "to" of the SIP URI in the SIP invite message to be transmitted by S-CSCF is merely for network routing purposes. So, the solution is invisible for the user terminals. The user terminals and the users thereof still experience that the session is established with the non-corrected SIP URI (i.e. "matti.vanhanen@elisa.fi" in the exemplary embodiments described above). In the embodiment of fixing the sender SIP URI, the corrected sender SIP URI is merely for the network routing purposes as well, the correction of the "from" field in the SIP invite message is not visible to the user terminals and the users thereof.

If a query is not successful, S-CSCF may be configured to send a notification message to UE1, indicating that the session initialization failed (for example, SIP URI in the SIP invite message transmitted by UE1 has a typing error or has never existed). In response to receiving the notification, UE1 may be configured to display a suitable indication to the user.

The present solution enables deriving the new SIP URI (or other relevant user equipment identifier) of a user terminal based on the user terminal's MSISDN (or MDN or a fixed telephone number), by utilizing a number portability check. It relates to providing a solution for managing the change of the home network operator of the user terminal.

In an embodiment, an original communication address identification (e.g. SIP URI) is replaced with a current communication address identification in an invitation message (e.g. SIP invite), in a situation where the home network operator of the user terminal has changed such that the original communication address identification has been kept for the user terminal.

In an embodiment, the replacing is non-visible to the user of the user terminal.

In an embodiment, a "to" and/or "P-asserted identity" field in the invitation message is checked and, if needed, updated.

In an embodiment, a "from" and/or "P-preferred identity" field in the invitation message is checked, and, if needed, updated.

In an embodiment, the invitation message is routed to a B subscriber on the basis of a retrieved second communication address identification of the B subscriber.

In an embodiment, the first communication address identification and the first communication number identification indicate an original home network operator of the user terminal, and that the second communication number identification and the second communication address identification indicate a current home network operator of the user terminal.

In an embodiment, the first and/or second communication address identification includes a session initiation protocol uniform resource identifier (SIP URI) of the user terminal.

In an embodiment, the first and/or second communication number identification includes a mobile subscriber international ISDN number (MSISDN) of the user terminal.

In an embodiment, a network apparatus is configured to update the communication address identification of an A subscriber or a B subscriber in the invitation message.

In an embodiment, the apparatus is configured to retrieve the communication number identification from a mobile number portability database.

In an embodiment, the apparatus is configured to retrieve the communication address identification from an enumeration database.

In an embodiment, the apparatus comprises a serving call state control function of the home network operator of an A subscriber.

The steps/points, signalling messages and related functions de-scribed above in FIGS. 1 to 3 are in no absolute chronological order, and some of the steps/points may be performed simultaneously or in an order differing from the given one. Other functions can also be executed between the steps/points or within the steps/points and other signalling messages sent between the illustrated messages. Some of the steps/points or part of the steps/points can also be left out or replaced by a corresponding step/point or part of the step/point. For example, S-CSCF may be configured to perform the final check, in which case messages 206 and 207 are not send, and instead of steps 306 and 307, the final check is performed. The operations to be executed illustrate a procedure that may be implemented in one or more physical or logical entities. The signalling messages are only exemplary and may even comprise several separate messages for transmitting the same information. In addition, the messages may also contain other information.

The techniques described herein may be implemented by various means so that an apparatus implementing one or more functions of a corresponding mobile entity described with an embodiment comprises not only prior art means, but also means for implementing the one or more functions of a corresponding apparatus described with an embodiment and it may comprise separate means for each separate function, or means may be, configured to perform two or more functions. For example, these techniques may be implemented in hardware (one or more apparatuses), firmware (one or more apparatuses), software (one or more modules), or combinations thereof. For a firm-ware or software, implementation can be through modules (e.g. procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

User terminal (user equipment) may refer to any user communication device. The term "user equipment" as used herein may refer to any device having a communication capability, such as a wireless mobile terminal, a PDA, a smart phone, a personal computer (PC), a laptop computer, a desktop computer, etc. For example, the wireless communication terminal may be an UMTS or GSM/EDGE smart mobile terminal. Thus, the application capabilities of the device according to various embodiments of the invention may include native applications available in the terminal, or subsequently installed applications. The network apparatus may be implemented in any network element, such as a server.

An apparatus capable of performing operation according to various embodiments of the present solution may refer to any communication entity, such as the network apparatus, database or the user terminal. The apparatus may generally include a processor, controller, or the like connected to or comprising a memory. The memory may include volatile and/or non-volatile memory and typically stores content, data, or the like. For example, the memory may store computer program code such as software applications or operating systems, information, data, content, or the like for a processor to perform steps associated with operation of the entity in accordance with embodiments of the present invention. Also, for example, the memory typically stores content transmitted from, or received by, the apparatus. Memory may be, for example, random access memory (RAM), a hard drive, or other fixed data memory or storage device. The processor may receive input from an input device and may display information on a display. The processor may also be connected to at least one communication interface or other means for transmitting and/or receiving data, content, messages, or the like. Where the apparatus provides wireless communication, such as in a UMTS, GSM, EDGE, WCDMA network, Bluetooth network, a wireless LAN network, or other mobile network, the processor may operate with a wireless communication subsystem of the interface. Where the apparatus provides an IP server with IP communication, the processor may operate with an IP communication system of the interface. One or more processors, memory, storage devices, and other computer elements may be used in common by a computer system and subsystems, as part of the same platform, or processors may be distributed between a computer system and subsystems, as parts of multiple platforms. If the apparatus is, for example, a mobile station or a network server, the apparatus may also include modules such as a messaging service client/server and/or an application associated with the processor. These modules may be software and/or software-hardware components. For example, a messaging service client/server may include software capable of establishing, modifying, and terminating messaging sessions, to send and receive messages, etc. The apparatus may generally include a processor, controller, control unit or the like connected to a memory and to various interfaces of the apparatus. Generally the processor is a central processing unit, but the processor may be an additional operation processor. The processor may comprise a computer processor, application-specific integrated circuit (ASIC), field-programmable gate array (FPGA), and/or other hardware components that have been programmed in such a way to carry out one or more functions of an embodiment. An interface provides a transmitter and/or a receiver or a corresponding means for receiving and/or transmitting data, content, messages including the above described advertisements, responses and solicitation messages.

At least some embodiments or aspects described herein may be implemented using programming stored within an appropriate storage circuitry described above or communicated via a network or other transmission media and configured to control appropriate processing circuitry. For example, programming may be provided via appropriate media including, for example, embodied within articles of manufacture, embodied within a data signal (e.g., modulated carrier wave, data packets, digital representations, etc.) communicated via an appropriate transmission medium, such as a communication net-work (e.g., the internet or a private network), wired electrical connection, optical connection or electromagnetic energy, for example, via communications interface, or provided using other appropriate communication structure or medium. Exemplary programming including processor-usable code may be communicated as a data signal embodied in a carrier wave in but one example.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A method for managing user terminal identification information in a communications system, wherein
in response to receiving, in a network apparatus, an invitation message to establish communication between user terminals, the method comprises:
examining a first communication address identification of a user terminal included in the invitation message, the examining comprising:
retrieving, based on the first communication address identification, a first communication number identification maintained for a corresponding user terminal;
based on the retrieved first communication number identification, retrieving a second communication number identification maintained for the user terminal; and checking whether the first communication number identification and the second communication number identification correspond to each other; and wherein based on a result of said checking, the method further comprises:

retrieving a second communication address identification corresponding to the second communication number identification; and forwarding the invitation message toward a recipient such that the second communication address identification is included in the invitation message; and updating in the invitation message, if needed, at least one of a communication address identification of an A subscriber and a communication address identification of a B subscriber.

2. The method according to claim 1, wherein the method further comprises:

replacing an original communication address identification with a current communication address identification in the invitation message, in a situation where a home network operator of the user terminal has changed such that an original communication address identification has been retained for the user terminal.

3. The method according to claim 2, wherein the replacing is nonvisible to a user of the user terminal.

4. The method according to claim 1, wherein the method further comprises:

checking and, if needed, updating at least one of a "to" and "P-asserted identity" field in the invitation message.

5. The method according to claim 1, wherein the method further comprises:

checking, and, if needed, updating at least one of a "from" and "P-preferred identity" field in the invitation message.

6. The method according to claim 1, wherein the method further:

comprises routing the invitation message to the B subscriber based on a retrieved second communication address identification of the B subscriber.

7. The method according to claim 1, wherein the first communication address identification and the first communication number identification indicate an original home network operator of the user terminal, and wherein the second communication number identification and the second communication address identification indicate a current home network operator of the user terminal.

8. A communications system, comprising:

a network apparatus including at least one processor, and at least one memory including computer program code;

wherein the computer program code in the at least one memory, when executed by the at one processor, causes the network apparatus, in response to receiving an invitation message to establish communication between user terminals, to examine a first communication address identification of a user terminal which is included in the invitation message, and the computer program code in the least one memory, when executed by the at least one processor, causes the network apparatus to:

retrieve, based on the first communication address identification, a first communication number identification maintained for the corresponding user terminal;

based on the retrieved first communication number identification, retrieve a second communication number identification maintained for the user terminal; and check whether the first communication number identification and the second communication number identification correspond to each other;

wherein based on a result of said checking, the computer code in the at least one memory, when executed by the at least one processor, further causes the network apparatus to:

retrieve a second communication address identification corresponding to the second communication number identification;

forward the invitation message toward a recipient such that the second communication address identification is included in the invitation message; and update in the invitation message, if needed, at least one of a communication address identification of an A subscriber and a communication address identification of a B subscriber.

9. An apparatus, comprising:

at least one processor; and at least one memory including computer program code;

wherein the computer code in the at least one memory, when executed by the at least one processor causes the apparatus, in response to receiving an invitation message to establish communication between user terminals, to examine a first communication address identification of a user terminal which is included in the invitation message, and the computer code in the at least one memory, when executed by the at least one processor, causes the apparatus to:

retrieve, based on the first communication address identification, a first communication number identification maintained for the corresponding user terminal;

based on the retrieved first communication number identification, retrieve a second communication number identification maintained for the user terminal; and check whether the first communication number identification and the second communication number identification correspond to each other;

wherein based on a result of said checking, the computer program in the at least one memory, when executed by the at least one processor, further causes the apparatus to:

retrieve a second communication address identification corresponding to the second communication number identification;

forward the invitation message towards a recipient such that the second communication address identification is included in the invitation message; and update in the invitation message, if needed, at least one of a communication address identification of an A subscriber and a communication address identification of a B subscriber.

10. The apparatus according to claim 9, wherein at least one of the first and second communication address identification includes a session initiation protocol uniform resource identifier of the user terminal.

11. The apparatus according to claim 9, wherein at least one of the first and second communication number identification includes a mobile subscriber international ISDN number of the user terminal.

12. The apparatus according to claim 9, wherein the apparatus is configured to replace an original communication address identification with a current communication address identification in the invitation message, in a situation where the home network operator of the user terminal has changed such that the original communication address identification has been kept for the user terminal.

13. The apparatus according to claim 9, wherein the apparatus is configured to update the communication address identification of the A subscriber or B subscriber in the invitation message.

14. The apparatus according to claim 9, wherein the apparatus is configured to retrieve the communication number identification from a mobile number portability database.

15. The apparatus according to claim 9, wherein the apparatus is configured to retrieve the communication address identification from an enumeration database.

16. The apparatus according to claim 9, wherein the apparatus is configured to route the invitation message to the B subscriber on the basis of a retrieved second communication address identification of the B subscriber.

17. The apparatus according to claim 9, wherein the first communication address identification and the first communication number identification indicate an original home network operator of the user terminal, and the second communication number identification and the second communication address identification indicate a current home network operator of the user terminal.

18. The apparatus according to claim 9, wherein the apparatus comprises a serving call state control function of a home network operator of an A subscriber.

* * * * *